UNITED STATES PATENT OFFICE.

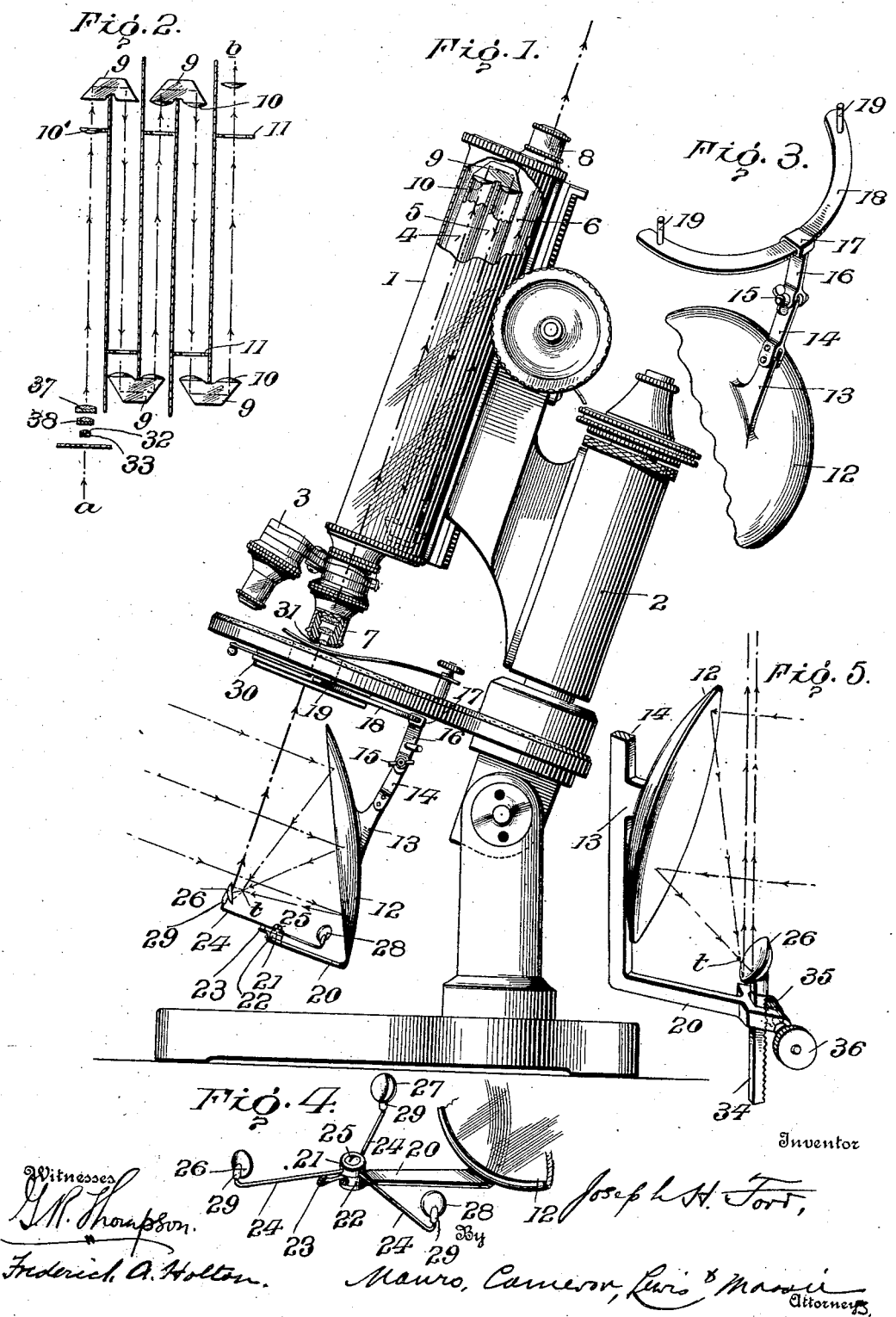

JOSEPH H. FORD, OF THE UNITED STATES ARMY.

MICROSCOPE.

No. 883,868.

Specification of Letters Patent.

Patented April 7, 1908.

Application filed July 2, 1906. Serial No. 324,524.

*To all whom it may concern:*

Be it known that I, JOSEPH H. FORD, of the United States Army, have invented a new and useful Improvement in Microscopes, which invention is fully set forth in the following specification.

This invention relates to optical instruments and particularly to improvements in compound microscopes, having for its object to improve the means for illuminating the field in such instruments and to increase the magnifying power without increasing the tube length of the instrument and without loss in intensity of light.

With these general objects in view, the invention provides for the use of condensed parallel rays of light in illuminating the object, thereby greatly intensifying the illumination, avoiding the use of the oil immersion for the object lens, and securing better illumination than can now be obtained by condensers, and also for the variation of the concentration of the reflected beam or rays.

The invention further provides for shortening the distance between the lens and the image of the object formed thereby, thus enabling a shorter tube length of the microscope to be used, also for increasing the magnifying power of the lens. It further provides for the bending of the rays entering the barrel of the instrument through the object lens back and forth on themselves and at the same time magnifying the size of the image, thereby securing the advantages of a long barrel with an actual shortening of its length. The invention also has for its object to secure high magnification and distinctness of image by use of low power lenses while avoiding spherical and chromatic aberration.

With these and other objects in view, which hereafter more clearly appear in the detailed description, the invention, briefly stated, consists in providing a microscope of the kind referred to with means for condensing and focusing illuminating rays on a reflecting surface and projecting such rays in parallel beams on the object to be examined under the microscope. As an illustration of such means, the one I prefer to use for the purpose consists of two reflectors adjustably mounted beneath the stage to give illumination in any desired direction, one being larger than the other, and both cut from parabolic mirrors of unequal size and whose respective axes are at right angles to each other. The smaller reflector is near the focus of the larger reflector, and is positioned to reflect and direct the condensed rays proceeding from the larger reflector in a parallel bundle of great or less intensity on the subject under microscopical examination. Instead of one small parabolic reflector associated with the focusing reflector, a plurality of such reflectors, each differing in size, may be arranged on a revoluble support and brought in turn or as desired into the focus of the large reflector to secure any desired degree and extent of illumination. The reflecting surfaces may be of silvered glass or may be of speculum or other metal. The character of this illumination renders unnecessary the use of oil immersion, since the rays are all parallel when they enter the tube of the microscope.

The means of illumination above described may be used in connection with the usual accessories of the microscope stage, such as iris or other diaphragms and disks of glass for varying the intensity and color of the light, and the improvement may be associated with any microscope, but it is peculiarly adapted for use with the construction of the instrument to be herein described.

The invention further resides in associating in combination with the coöperating elements of a microscope of the kind above referred to, an object lens of high power, consisting of a diamond, or of a diamond and some transparent substance such as flint glass. Such lens has the capability of giving higher magnification for a given curvature than lenses of crown and flint glass now generally employed, and enables shortening of the tube length of the microscope. This results from the fact that the refractive index of diamond is greater than that of glass, and a lens made in whole or in part of diamond will have to focus nearer the lens than would a lens made of glass alone. The use of such a lens enables the distance between the lens and the image of the object which it forms to be shortened, thereby increasing its magnifying power, and also permitting the shortening of the tube length.

Another and very important feature of the invention resides in the construction and arrangement of the system of reflecting prisms and lenses within the tube of the microscope whereby the rays of light entering the object lens are bent back and forth on themselves, enabling a distinct and magnified image of the object to be obtained without increasing the length of the tube, and with the aid of lower power lenses and less aberration than in microscopes as ordinarily constructed giving the same magnifying power. To secure this result I divide the barrel of the microscope into a plurality of longitudinal compartments, preferably formed from a number of blackened tubes. The lower end of one tube receives the rays from the object through the object lens. Another tube of the series receives the outgoing rays which pass through the eye piece. The opposite end of each of these tubes is provided with a reflector such as a prism preferably of crown glass cut in such a manner that the light impinging on its inclined surfaces will be reflected at right-angles to the impinging beam. Each intermediate tube of the series is also provided at both ends with similar prisms cut in a similar manner and arranged to bend the beam of light back and forth on itself till it is emitted at the eye piece. The reflectors may be made of a single rectangular prism or of a pair of such prisms cemented face to face, the reflecting surfaces being inclined at 45° to the axes of their respective tubes, directing the rays of light in substantially parallel beams separated from each other by the blackened walls of the tubes. Large magnification in compound microscopes by use of lenses of low magnifying power has not heretofore been practical because of the unwieldy length of the tube necessary under such conditions; but by sending the ray of light in the manner above indicated, I am enabled to secure the advantages of great tube length by use of a plurality of short tubes arranged side by side with but a small increase in the diameter of the barrel, at the same time using lenses of low power. To further increase the magnifying effect produced by the arrangement described above, I may and preferably do associate with the reflecting prisms one or more lenses in the path of the rays from the object. These lenses may be placed in the path of the rays in various positions, such as on one or more of the faces of the reflecting prisms or separate therefrom, or both arrangements may be used. Diaphragms may also be used in the path of the rays between the object lens and eye piece for the purpose of cutting out errant rays of light and lenses of different powers may be used in the object lens and eye piece, and the tubes for the multiple beams of light may be arranged in various ways, those securing the greatest compactness being preferred.

The invention further embraces other features and novel constructions and combinations of parts hereinafter fully set forth, reference being had to the accompanying drawings which are designed merely as illustrations to assist the description of the invention and not as defining the limits thereof.

Figure 1 is a view in elevation showing my improvements; Fig. 2 is a diagrammatic view showing an arrangement of the reflectors and lenses; Figs. 3 and 4 are details in perspective of the illuminating devices; Fig. 5 is a view in elevation showing means for giving vertical adjustment to the small mirror.

The barrel 1 of the microscope is mounted on the pillar 2, and is provided with the usual means for coarse and fine adjustment common to any high power instrument, and has a nose piece 3 for supporting object lenses of different focal length. The barrel 1 which in the present illustration is provided with three reflector tubes 4, 5 and 6, each made of blackened metal, and which assumes a more or less triangular form, may, however, be provided with any number of such tubes. The lower end of the reflector tube 4 is in alinement with the object lens 7, and the upper end of reflector tube 6 is in alinement with the eye piece 8. The upper end of tube 4 is closed by a reflecting prism 9, preferably of crown glass having on its face a plano-convex lens 10. The first reflecting surface of prism 9 is inclined at an angle of 45° to the axis of reflector tube 4. The second reflecting surface of prism 9 cuts the axis of reflector tube 5 at a like angle, while the emergent face of prism 9 is also provided with a lens and closes the upper end reflector tube 5'. The lower ends of tubes 5 and 6 are similarly provided with a reflector prism and lenses. Although I have shown each of the prisms provided with lenses, one or all of said lenses may be omitted or located separately from the surfaces of the prisms. Instead of two reflectors as here shown, I may use any number within the limits of the illuminating power of the instrument and the lenses may be of varying magnifying power. Within each tube is preferably placed one or more diaphragms 11 (Fig. 2) for cutting out errant rays of light.

The illumination device consists of a parabolic mirror 12 associated with one or more smaller parabolic mirrors 26, 27 or 28, the larger mirror 12 constituting the focusing mirror and the smaller ones reflecting and condensing mirrors. These mirrors constitute segments cut from parabolic mirrors, differing in size. In order to secure the proper relation between the larger mirror and any one of the smaller mirrors whereby rays focussed by the larger mirror may be reflected in a condensed and parallel pencil, it is essential that two similar parabolic mirrors be selected differing in size. The two mirrors may then be considered as arranged with their axes at right angles and their foci coincident. By now passing parallel planes properly inclined to the axes of the mirrors cutting off segments of the same, the two mirrors will have the desired relation.

Focusing mirror 12 is provided at its back with a lug 13 to which is made fast an arm 14, having a pivoted clamp connection 15 with a slidable supporting member 16 having at its upper end an eye piece 17, receiving a semi-circular flat member 18, on which it readily slides. Member 18 is secured beneath the stage of the microscope by means of pins 19, and its center of curvature is made to coincide substantially with that of the axis of the stage opening, thereby enabling the illuminating device to take any horizontal position within the limits of the arc formed by the curved member 18 and to illuminate the object from various directions. By means of this construction, the focusing mirror 12 may be given a vertical as well as horizontal adjustment through all the positions necessary for practical work. Secured to the lower part of the focusing mirror 12 is an arm 20 carrying at its free end a revoluble mirror support. This supporting means may take on various forms, the one illustrated and the one often preferred consisting of a central hub 21 of metal resting on a stationary bushing 22 carrying a stop member 23 for yieldingly holding radial mirror carrying supporting arms 24. The mirror supporting hub is held in revoluble position on the end of arm 20 by a pivot 25.

In Fig. 4 I have shown three mirrors 26, 27 and 28, thus revolubly supported, but any number may be employed, differing in size to give a greater or less condensation of light as desired. Each of the reflecting mirrors is preferably mounted on a metal backing and provided with a socket for mounting the same on the arms 24. The reflecting or condensing mirrors are so positioned on their supports that, when one of them is moved into working position and locked by stop 23, its axis, which is that of the parabolic mirror from which it was cut, is at right angles to that of the focusing parabolic mirror 12, and its focus F coincides with that of mirror 12. In this position the parallel rays received on mirror 12 are directed to the common focus of both mirrors and reflected and condensed by the smaller. Beneath the stage and secured thereto is a diaphragm and rest for disks of glass 30, the purpose of which is well understood and needs no further mention.

Although I have described above a plurality of small mirrors revoluble about a common center, I may, however, employ a single mirror as illustrated in Fig. 5, and provide the same with means for vertical adjustment such as may be attained by mounting the mirror 26 on the end of a vertically adjustable arm 34, having rack teeth for engaging a pinion 35 which may be rotated by means of a milled head 36 on a spindle fast to the pinion and supported in the forked members of arm 20. The mirror 26 may also be revolubly supported on the end of rod 34 to enable further adjustment in a plane transverse to its vertical support 34.

In Fig. 1 is illustrated the object lens 31 which is made of diamond and flint glass, and is to be used especially in high power objectives. The form of the lens here shown is plano-convex and is associated with back combinations 37, 38, but the diamond lens may assume other forms, such as a double convex lens 32 (Fig. 2) in which form it is preferable to use it with a plano-convex lens 33 of crown glass. It is obvious that it may be used alone or with one or more combinations of lenses of glass, and secure the advantages of a material having a greater density and refractive power than the various forms of glass lenses generally employed in the construction of such objectives. By reason of the use of a lens constructed in whole or in part of diamond the image formed by such a lens is nearer the lens than in the case where glass is used, and thereby enables the tube length of the microscope to be shortened in consequence, and to secure greater compactness of the instrument.

The operation of the device will be readily understood from the preceding description. Having assembled the various parts into operative relation and made the preliminary adjustments for focusing, in a manner well understood by those skilled in the art, the proper illumination is secured by bringing the focusing mirror 12 into position to receive the light rays from a suitable source, which are then brought to a focus near the point of the smaller condensing reflector. The position of this focus as previously explained is that of the condensing mirror, and therefore the rays emanating from this common focus are passed on by the second mirror as a condensed parallel pencil through the diaphragm 30 illuminating the object and passing into the tubes of the microscope, wherein they are bent back and forth on themselves as a pencil a, b, by the reflecting surfaces of the several prisms. During this passage of the rays through the several tubes, errant rays are cut out by diaphragms 11 and the diverging and converging of the rays is more or less modified as required by means of lenses 10, 10, located on or near the front or rear or front and rear faces of the prisms. The real image is viewed through the eye piece 8 of the ordinary construction. By reason of the arrangement whereby the path of light is bent back and forth on itself and the improved means of increased illumination which permits of such a tortuous bending of the path, I am enabled to secure increased magnification with lenses of low power; to avoid in a marked degree evil effects of aberration and to secure greater compactness of structure. By employing the diamond lens where high power objectives are desired, further advantages in magnifying power are secured.

The construction shown in Fig. 5 embodies the fundamental principle of operation of focusing and condensing by similar parabolic mirrors arranged with their axes at right angles, but has an additional feature whereby the reflected beam may be given a greater or less degree of diffusion. The mirror 26 is so positioned that by the rotation of the milled head 36 and consequent elevation of the mirror supporting arm 34, it may be made to approach or recede from the focus of the focusing mirror and reflect the light passing through the focus $t$, while maintaining its own focus coincident with that of the focusing mirror 12. As a result of this adjustment the condensing mirror is enabled to receive the diverging rays of light from focus $t$ at shorter or longer distances within the range of its operation and to reflect these differently diffused rays in a beam which has a corresponding degree of diffusion, thereby enabling any desired degree of condensation to be secured.

It is to be noted that although the several features of the invention have been described together in a unitary structure, yet some of the features may be omitted, such as the lenses on the prisms, or the diamond lens or the illuminating apparatus may be associated with other forms of microscope.

What I claim is:

1. In a microscope, in combination, a casing provided with an objective and eye-piece, means for bending the image-forming rays back and forth on themselves before emerging at the eye-piece, and successive image-magnifying lenses associated with said bending means.

2. In a microscope, in combination, a casing provided with an objective, an eye-piece, and a plurality of longitudinal compartments, a plurality of reflecting surfaces for directing the image-forming rays through said compartments, and successive image-magnifying lenses associated with said surfaces.

3. In a microscope, in combination, a casing provided with an objective, an eye-piece, a plurality of longitudinal compartments, a plurality of reflecting prisms for directing the image-forming rays through said compartments, and successive image magnifying lenses associated with said prisms.

4. In a microscope, in combination, a casing provided with an objective, an eye-piece and a plurality of compartments, a plurality of reflecting surfaces for directing the image-forming rays through said compartments, a diaphragm in the latter for cutting out errant rays, and successive magnifying lenses associated with said surfaces.

5. In a microscope, the combination of a casing provided with a plurality of longitudinal compartments, a plurality of reflecting surfaces within said casing for directing the image forming rays through said compartments, and a plurality of parabolic mirrors in operative relation to said surfaces and to each other to produce a condensed parallel pencil of light for illuminating the object.

6. In a microscope, the combination of a casing having an eye-piece, an objective provided with a diamond lens, and a plurality of longitudinal compartments; a plurality of reflecting surfaces in said casing directing image forming rays through said compartments, and a plurality of parabolic mirrors in operative relation to said surfaces and to each other to produce a condensed parallel pencil of light for illuminating the object.

7. In combination with a microscope, an illuminating device consisting of an adjustably supported focusing mirror, a second mirror having a focus in common with the first mirror and movable in relation to said first mirror, and acting as a reflecting condenser to the first.

8. In combination with a microscope having a stage, a parabolic mirror adjustably secured to said stage and a smaller parabolic mirror having a focus in common with the first mirror and movably mounted on the same.

9. In a microscope, the combination of a stage, a parabolic mirror supported from said stage, means for moving said mirror in planes parallel to and at right angles to said stage, and a second parabolic mirror having a focus in common with said first mirror, and a revoluble carrier for the same mounted on said first mirror.

10. In a microscope, the combination of a stage, a parabolic mirror supported from said stage, means for moving said mirror in planes parallel to and at right angles to said stage, a second parabolic mirror having a focus in common with said first mirror, a revoluble carrier for the same mounted on said first mirror, and a catch for holding the mirrors in operative relation to each other.

11. In combination a parabolic focusing mirror, a second parabolic mirror having its focus in common with said first mirror, and means for moving one mirror relatively to the other while maintaining the axes of the two mirrors at right angles to each other, and a compound microscope receiving said rays.

12. In combination with a microscope, an illuminating device consisting of an adjustably supported focusing parabolic mirror, and a second parabolic mirror having a focus in common with said first mirror and movable in relation to the same, and acting as a reflecting condenser to the first.

13. In combination with a microscope, two parabolic mirrors of different sizes having their principal axes at right angles to each other and their foci in common, and consisting of similar segments cut from similar parabolic mirrors whereby rays falling on the larger mirror are converged to the common focus and are reflected from the second mirror in a condensed and parallel pencil.

In testimony whereof I have signed this specification in the presence of two subscribing witnesses.

JOSEPH H. FORD.

Witnesses:
    ALF. WETHERILL,
    HENRY L. BROWN.